(12) United States Patent
Pursifull et al.

(10) Patent No.: US 10,946,739 B2
(45) Date of Patent: Mar. 16, 2021

(54) AUTOMOTIVE ACCESSORY DRIVE TRAIN

(71) Applicant: Ford Global Technologies, LLC, Dearborn, MI (US)

(72) Inventors: Ross Dykstra Pursifull, Dearborn, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 16/156,771

(22) Filed: Oct. 10, 2018

(65) Prior Publication Data

US 2020/0114759 A1    Apr. 16, 2020

(51) Int. Cl.
| | | |
|---|---|---|
| *B60K 25/02* | (2006.01) | |
| *B62D 5/06* | (2006.01) | |
| *B60H 1/32* | (2006.01) | |
| *B62D 6/00* | (2006.01) | |
| *B62D 6/08* | (2006.01) | |

(52) U.S. Cl.
CPC ........... *B60K 25/02* (2013.01); *B60H 1/3208* (2013.01); *B60H 1/3222* (2013.01); *B62D 5/063* (2013.01); *B62D 6/08* (2013.01); *B60H 2001/3292* (2013.01); *B60K 2025/022* (2013.01)

(58) Field of Classification Search
None
See application file for complete search history.

(56) References Cited

U.S. PATENT DOCUMENTS

| | | | |
|---|---|---|---|
| 3,708,028 A * | 1/1973 | Hafer | H01M 2/10 180/65.1 |
| 4,489,242 A | 12/1984 | Worst | |
| 5,669,842 A | 9/1997 | Schmidt | |
| 6,668,953 B1 | 12/2003 | Reik et al. | |
| 7,921,950 B2 | 4/2011 | Harris | |
| 8,800,701 B1 | 8/2014 | Sadler | |
| 9,102,221 B1 * | 8/2015 | Monfort | B60L 3/0061 |
| 9,561,713 B2 * | 2/2017 | Netherland | F16M 1/00 |
| 2007/0080037 A1 | 4/2007 | Larry et al. | |
| 2008/0236910 A1 * | 10/2008 | Kejha | B60L 50/16 180/265 |
| 2011/0202234 A1 | 8/2011 | Bradley et al. | |
| 2011/0320078 A1 | 12/2011 | McGill | |
| 2013/0112490 A1 * | 5/2013 | Grishashvili | B60K 1/00 180/65.1 |
| 2017/0029054 A1 * | 2/2017 | Woodward | B60W 20/10 |
| 2017/0334437 A1 * | 11/2017 | Mikami | B60K 6/387 |
| 2018/0022387 A1 * | 1/2018 | Ta | B60K 1/04 180/291 |
| 2018/0079308 A1 * | 3/2018 | Monfort | B60L 50/64 |
| 2018/0166945 A1 * | 6/2018 | Colavincenzo | B60K 6/442 |
| 2018/0223746 A1 * | 8/2018 | Mack | B61C 17/12 |

* cited by examiner

*Primary Examiner* — Abdhesh K Jha
(74) *Attorney, Agent, or Firm* — Geoffrey Brumbaugh; McCoy Russell LLP

(57) ABSTRACT

Methods and systems are provided for a vehicle adapted to be operated based on fuel combustion or electric power. In one example, an accessory train of the vehicle, including an air conditioning pump and a power steering pump, may be operated according to a first mode or according to a second mode based on a power system of the vehicle. When in the second mode, the vehicle may be instructed to coordinate operation of the air conditioning pump and the power steering pump.

19 Claims, 6 Drawing Sheets

AUTOMOTIVE ACCESSORY DRIVE TRAIN

FIELD

The present description relates generally to a vehicle operable via fuel combustion or electric energy.

BACKGROUND/SUMMARY

Increasing demand for electrically-powered vehicles has motivated efforts to provide alternatives to fuel-dependent products in the automotive industry. While all-electric and hybrid electric passenger vehicles now have a solidified presence in the product lines of several automotive manufacturers, electrification of large trucks remains scarce. In particular, for trucks categorized as over 8500 pounds gross vehicle weight, development of a low volume electric truck may be cost-prohibitive.

An electric conversion kit for vehicles configured with internal combustion (IC) engines may be an attractive alternative to manufacturing a new production line of trucks. The kit may be retrofitted to a conventional IC engine truck according to already existing models and enable the truck to utilize electrical energy to drive a propulsion system of the truck and/or operate accessory components. The retrofit kit may also be readily installed in already existing trucks and vehicles, providing an option for operators to reduce a dependency on fossil fuels.

An example of such an approach is shown by Sadler in U.S. Pat. No. 8,800,701. Therein, an electric conversion assembly for an internal combustion engine vehicle may be implemented by removing the original IC engine. Components of the conversion assembly are installed in the former location of the IC engine including a small IC engine, an electric drive motor, an electricity production unit, a battery pack, and adapters. Accessories of the vehicle are adapted to be electrically operated. An air conditioning (AC) compressor is powered by a separate motor that may be coupled to a solar panel system to utilize solar energy. Other accessories such as a power steering pump and a power brake vacuum pump are actuated by a battery-powered drive belt. A fuel efficiency of the converted hybrid electric vehicle may be improved while release of undesirable combustion byproducts may be reduced.

However, the inventors herein have recognized potential issues with such systems. As one example, while dependency on hydrocarbon fuels is decreased, the converted vehicle still relies on the IC engine for power output. As well, operation of the AC compressor via a separate energy system from the other accessories imposes additional components and system controls that may increase costs and add complexity to the conversion kit. A marketing appeal of the electrical conversion assembly may be diminished, discouraging a commercial movement to advance electrification of large vehicles.

In one example, the issues described above may be addressed by a line vehicle comprising a frame, an accessory train installed within the frame, the accessory train including a belt driving a power steering pump and an air conditioning (AC) compressor, and a controller storing a first set of instructions and a second set of instructions in a memory of the controller, the first set of instructions executable to operate the accessory train when the controller detects an engine is installed in the frame, the second set of instructions executable to operate the accessory train when the controller detects a traction motor and not an engine is installed in the frame. In this way, a vehicle, such as a truck may be converted to be a fully electric vehicle with accessory components that may continue to be operated even when an IC engine is removed from the vehicle.

As one example, the line of vehicles may be adapted with an accessory train, including components such as a power steering pump, an AC compressor, and power brake vacuum pump, which may be driven by a single drive belt. The movement of the drive belt may be powered by an IC engine or by an electric motor. A load on the drive belt may be reduced by configuring the accessory train to alternate activation of two accessory train components. By alternating supply of energy between the two components so that one component is inactive while the other component is active, the electric motor that may drive the belt in place of the IC engine may be relatively small. The same set of accessory drive components may be used with the IC engine present or when the vehicle undergoes conversion to electric power. A cost of conversion to fully electric operation is thus reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
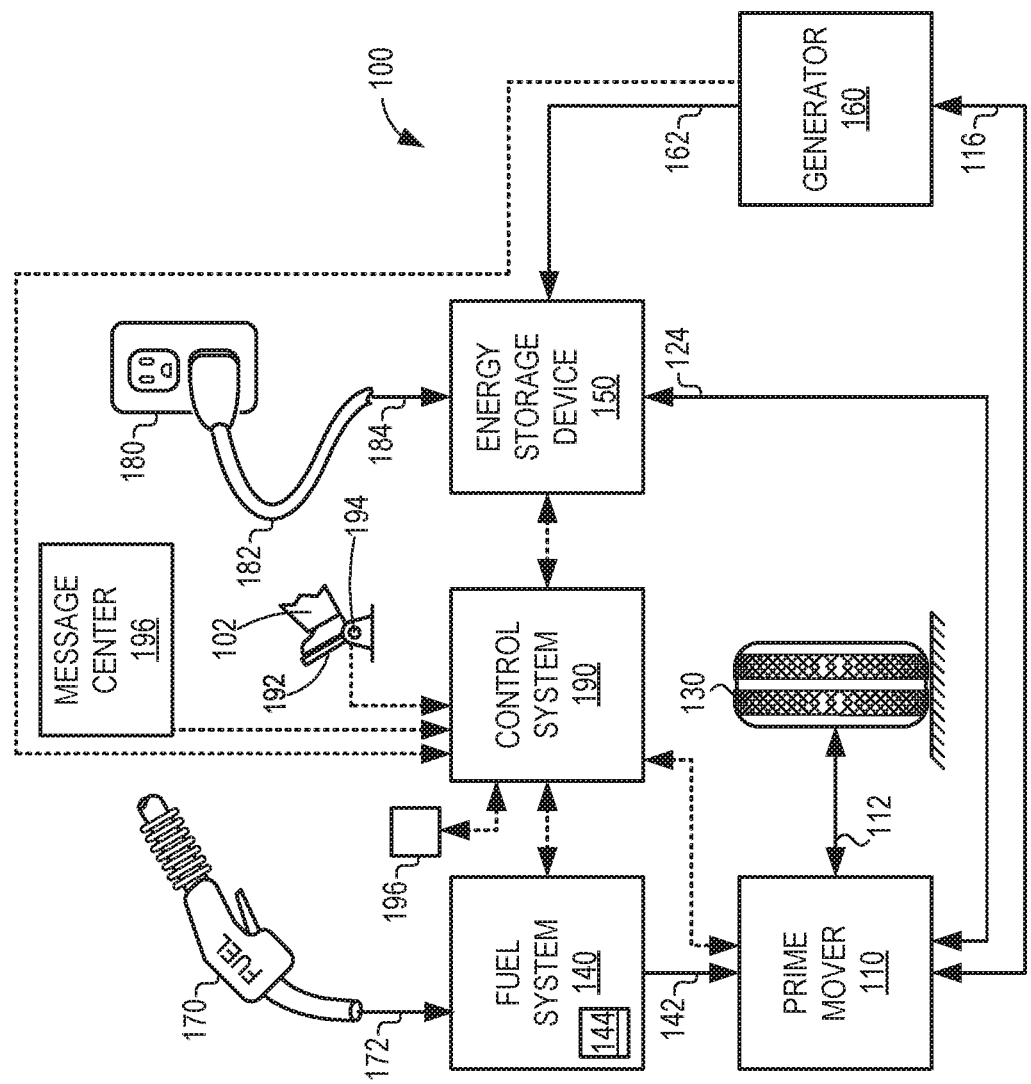
FIG. 1 shows a schematic diagram of a vehicle propulsion system that may be adapted to include an internal combustion engine or an electric motor.
Figure 3:
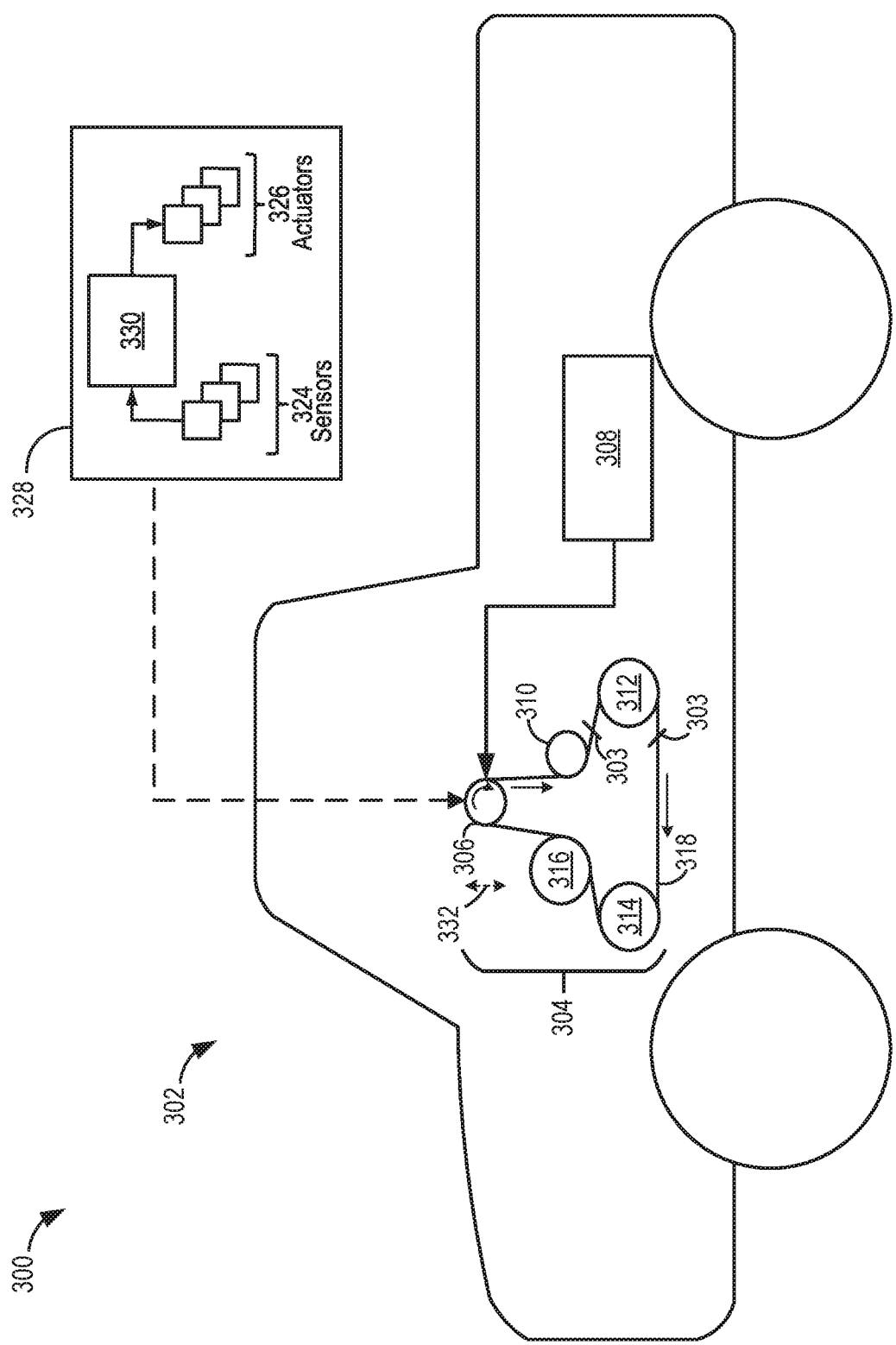
FIG. 3 shows a second schematic diagram of a second example of a vehicle from the production line of vehicles with an electric actuator operating the accessory train.
Figure 4:
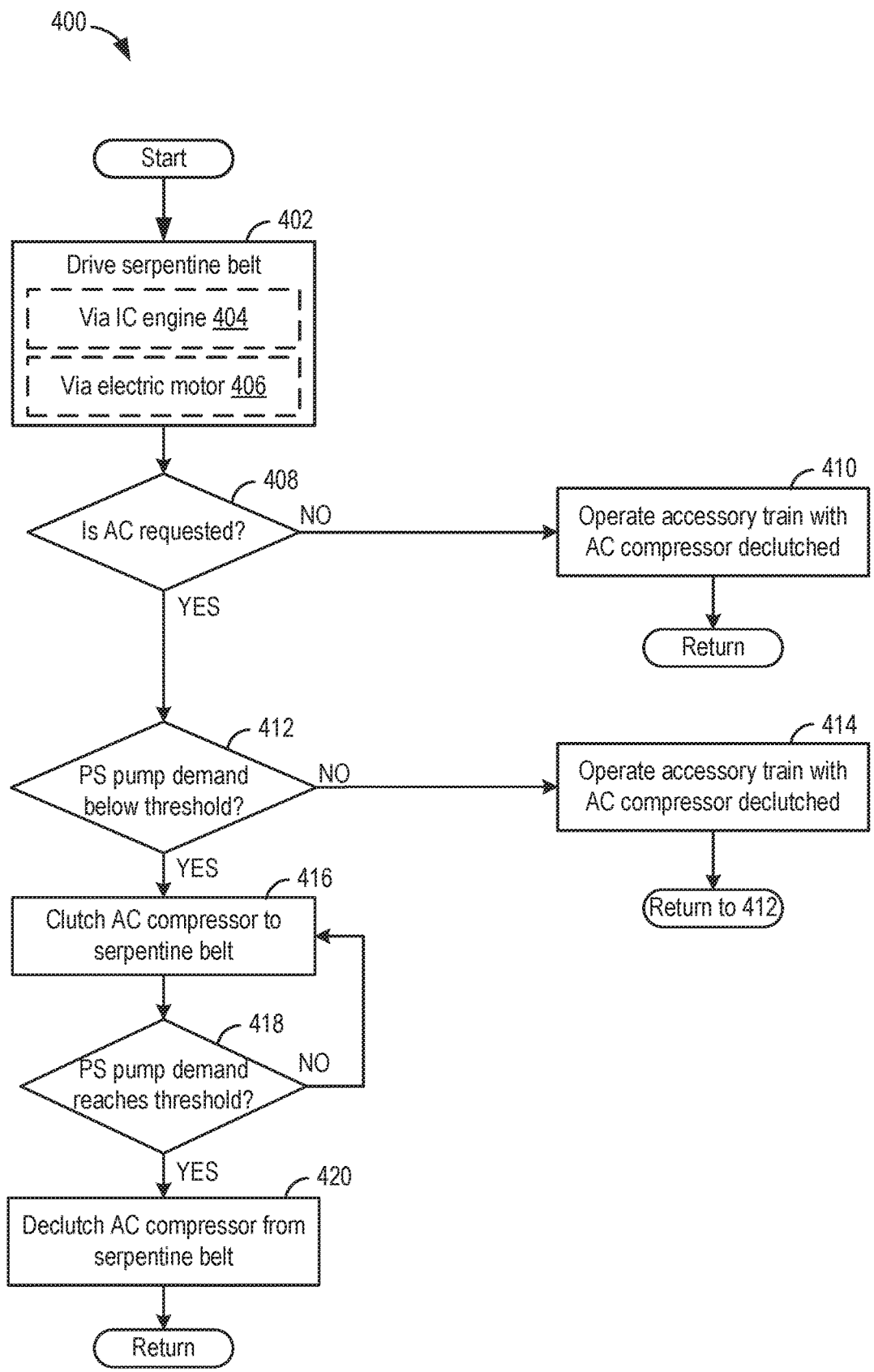
FIG. 4 shows an example of a method for operating the accessory train.
Figure 5:
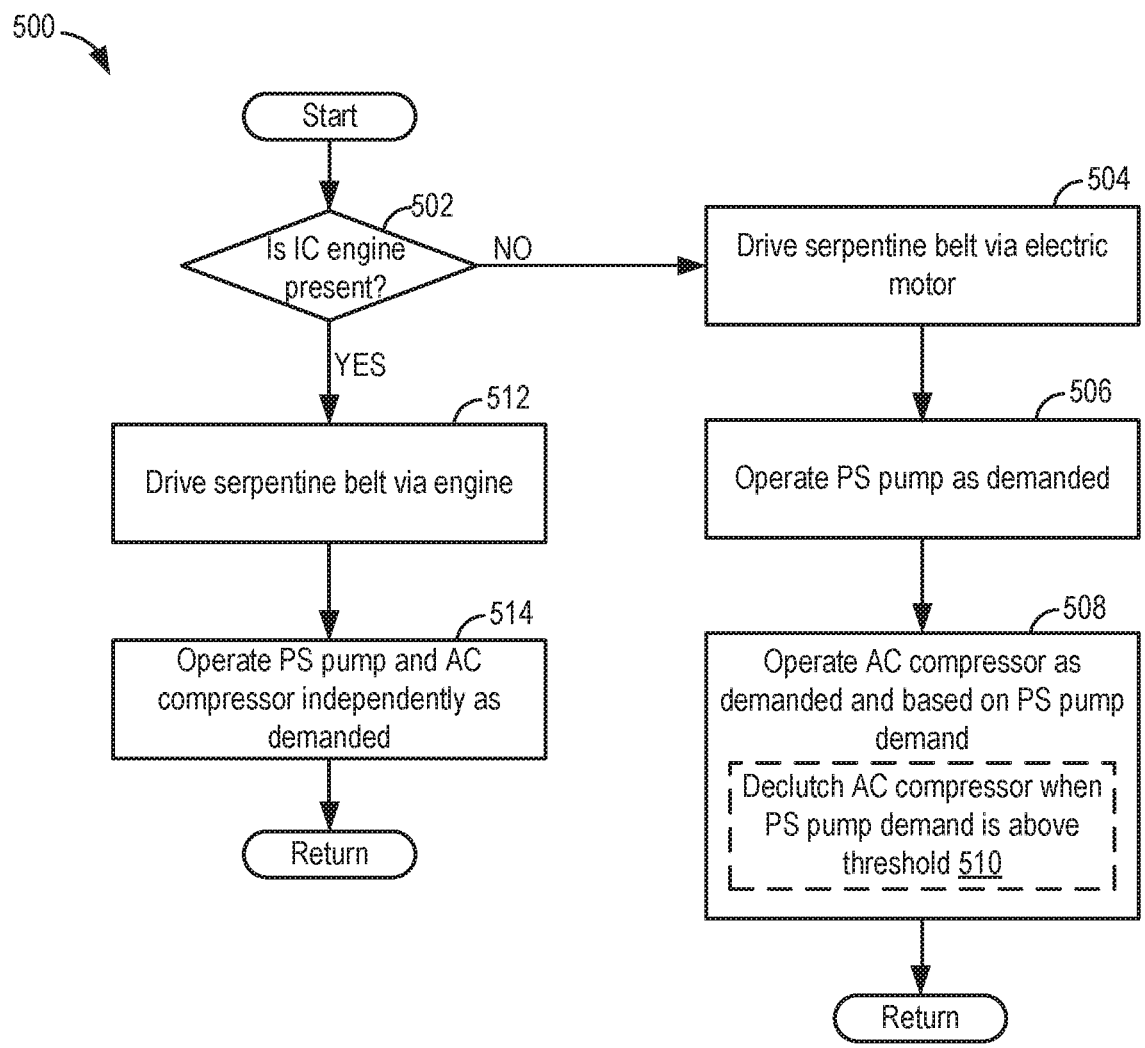
FIG. 5 shows a second example of a method for operating the accessory train in a line of vehicles that may be adapted with an IC engine or an electric motor to drive the accessory train.
Figure 6:
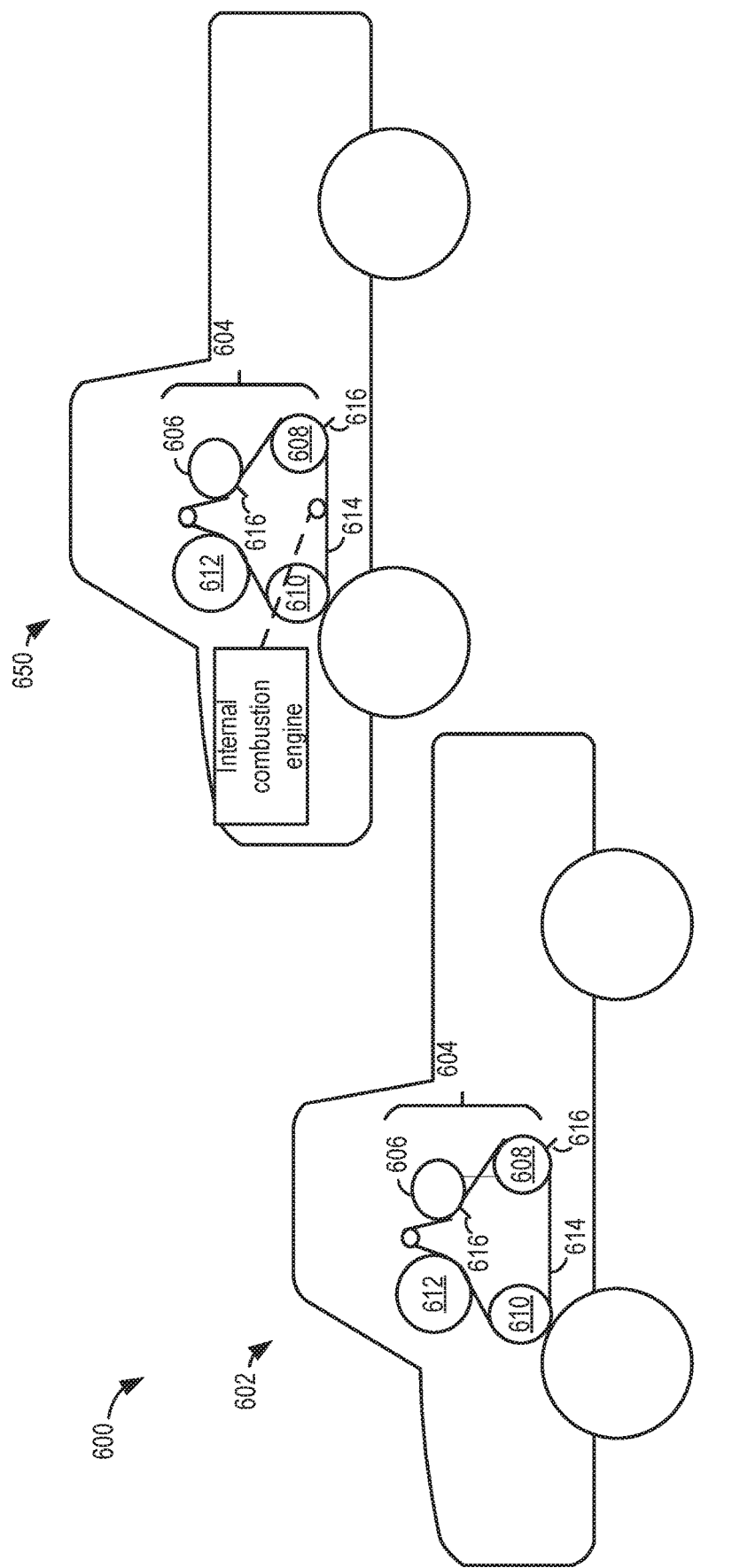
FIG. 6 shows example vehicles that may be produced in a line of vehicles configured to be operable by either an IC engine or an electric motor.

The following description relates to systems and methods for a line of vehicles that may be converted from engine operation to electric operation. Each vehicle of the line of vehicles may include a propulsion system that may propel a vehicle with a conventional internal combustion (IC) engine or with an electric motor, as depicted in FIG. 1. The line of vehicles may include an accessory train with a drive belt to operate a power steering pump, a power brake vacuum pump, and an air conditioning compressor. A first example of a vehicle from the line of vehicles that includes the IC engine to operate the accessory train is shown in a first schematic diagram in FIG. 2. A second example of a vehicle that includes a similar accessory train but operated by an electric actuator instead of the IC engine is illustrated in a second schematic diagram in FIG. 3. An example of a method for a vehicle for operating the accessory train is depicted in FIG. 4. The controller may control operation of the AC compressor and power steering pump such that operation of the power steering pump is prioritized over operation of the AC compressor, thereby preventing simultaneous operation of the power steering pump and AC compressor, which may allow for a smaller electric motor to be utilized to drive the accessory train. An example of a method for a line of vehicles, manufactured with the accessory train and configured to utilize either an IC engine or an electric motor as a prime mover is shown in FIG. 5. The method may be used by a controller of a vehicle from the line of vehicles to choose between following a first set of instructions or a second set of instructions depending on a configuration of the vehicle. A first and second vehicle that may be manufactured in the line of vehicles is shown in FIG. 6. The first vehicle may be produced without a prime mover for operating the vehicle, thus adaptable to either an IC combustion engine or to an electric motor, while the second vehicle includes the IC engine.

Turning now to the figures, FIG. 1 illustrates an example vehicle propulsion system 100. Vehicle propulsion system 100 includes a prime mover 110, configured to power rotation of a drive wheel 130. In one example, the prime mover 110 may be an internal combustion engine consuming a liquid fuel (e.g. gasoline, ethanol, or a gasoline-ethanol blend) to produce an engine output. The prime mover 110, when configured as an engine, may be operated by combusting fuel received from fuel system 140 as indicated by arrow 142. For example, the prime mover 110 may be operated to propel the vehicle via drive wheel 130 as indicated by arrow 112. In such an embodiment, the vehicle may be configured as a conventional vehicle powered by combustion of fuel in the fuel burning engine. During select conditions the engine may drive a generator 160, which may in turn supply electrical energy to an energy storage device 150 as indicated by arrow 162.

In another example, the vehicle may be configured as a fully electric vehicle, relying solely on electrical energy to power the vehicle. As such, the prime mover 110 may be an electric motor that similarly propels the drive wheel 130 based on electrical power derived from energy storage device 150. The prime mover 110, when configured as an electric motor, may be operated to also charge energy storage device 150. For example, the prime mover 110 may receive wheel torque from drive wheel 130 as indicated by arrow 112 where the motor may convert the kinetic energy of the vehicle to electrical energy for storage at energy storage device 150 as indicated by arrow 124. This operation may be referred to as regenerative braking of the vehicle. Thus, the prime mover 110 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

The vehicle may be manufactured with an IC engine that may be replaced by an electrification kit including the electric motor as the prime mover 110, the energy storage device 150, and the generator 160. Alternatively, the vehicle may be manufactured with the electric motor as the prime mover 110, the energy storage device 150, and the generator 160. In still further examples, the vehicle may be manufactured without the prime mover 110, enabling a customer to install either an IC engine or an electric motor as the prime mover 110. In yet other examples, the vehicle may include both the internal combustion engine and the electric motor. The vehicle may be adapted to alternate between activating the engine and activating the motor, depending on driving conditions and a charge status of energy storage device 150. Regardless of whether the vehicle is manufactured with an IC engine, an electric motor, or no prime mover, the vehicle may comprise an accessory train, including accessory train components such as an air conditioning (AC) compressor, a power steering pump, etc., and instructions stored in a control system 190 of the vehicle configured to adapt operation of the accessory train based on whether the prime mover is the IC engine or the electric motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to prime mover 110, when prime mover 110 is an engine, as indicated by arrow 142. Still other suitable fuels or fuel blends may be supplied to prime mover 110, where they may be combusted at the engine to produce an engine output. The engine output may be utilized to propel the vehicle as indicated by arrow 112 or to recharge energy storage device 150 via generator 160, as indicated by arrow 116.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. Energy storage device 150 may be connected to a power source 180 via an electrical transmission cable 182 and receive electrical energy from power source 180, as indicated by arrow 184. As a non-limiting example, energy storage device 150 may include one or more batteries and/or capacitors.

Control system 190 may communicate with one or more of the prime mover 110, fuel system 140, energy storage device 150, and generator 160. Control system 190 may receive sensory feedback information from one or more of the prime mover 110, fuel system 140, energy storage device 150, and generator 160. Further, control system 190 may send control signals to one or more of the prime mover 110, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Control system 190 may be adapted with a plurality of algorithms stored in a memory of a controller of the control system 190. The plurality of algorithms may include instructions for operation of accessory components, e.g., a power steering pump or an AC compressor, of the vehicle depending on the configuration of the prime mover 110 as a conventional fuel combustion or as an electrically powered motor.

In some embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to the prime mover 110, configured as an engine, for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196. Furthermore, the fuel system 140 may include one or more sensors for detecting a fuel composition when more than one fuel type is used for combustion, as well as for measuring a fuel pressure.

A vehicle, configured to be powered either by an internal combustion (IC) engine or by an electrical power source coupled to a traction motor may include an accessory train driven by an accessory drive belt. The accessory train may comprise vehicle accessory components such as an AC compressor, a power steering pump, and a vacuum pump for power brakes. In other examples, the power brakes may be coupled to the power steering pump rather than directly to the accessory drive belt and driven by hydraulic pressure derived from the power steering pump instead of vacuum actuation.

In one example, the accessory components, such as the AC compressor, power brake vacuum pump, and power steering pump, may be driven concertedly by a single actuator either powered by electrical energy or by fuel combustion. A dependency on an IC engine to run the accessories may thus be removed, allowing for exclusion of the engine and substitution by an electric motor. In conventional vehicle systems, accessory components already existing in the IC engine-driven vehicles may not be readily adapted to the electric actuator, having dimensions or high power demands tailored to energy provided by combustion. Replacement of the accessories with electrically-operable components may thus be necessary, adding significant cost to the conversion process. Additionally or alternatively, coupling of the components with a large electric motor may be demanded, with the motor occupying an undesirably large volume of space, drawing large quantities of power, and/or adding weight to the vehicle.

By adapting a vehicle with the accessory train as described herein, the vehicle may be readily convertible between fuel propulsion by fuel combustion or by electrical energy without replacing the accessory components of the accessory train. Significant cost savings are enabled as a result, increasing a marketing appeal of the conversion to electric operation. The accessory train may be further configured to reduce a load on the actuating device of the accessory train, improving an energy efficiency of the accessory train and further contributing to cost savings of the line of electrifiable vehicles.

Each of the accessory component described above may rely on a rotary force provided by the accessory drive belt to actuate the accessory components. Each accessory component of the accessory train may be coupled directly to the drive belt so that rotation of the drive belt translates to a rotating power element of the accessory component, providing power to the component when the component is activated for operation. Movement of the drive belt may be actuated by either the IC engine or by an electric motor (independent of the traction motor). The line of vehicles described herein may be manufactured with the accessory components configured to couple to the drive belt and adapted to operate regardless of a type of propulsion system of the vehicle.

An example of a first vehicle 602 that may be manufactured in a line of vehicles 600 configured to be operated either by an IC engine or by an electric motor is shown in FIG. 6. The first vehicle 602 may include components that are not involved in powering movement of the vehicle, such as wheels, axles, a passenger cabin, bumpers, side panels, windows, lights, etc. The first vehicle 602 may also include an accessory train 604. The accessory train 604 may include accessory components such as an idler pulley 606, an air conditioning (AC) compressor 608, a power steering pump 610, and a vacuum pump 612 coupled to power brakes of the vehicle 602.

The accessory components of the accessory train 604 may each be coupled and in contact with a continuous serpentine belt 614. The accessory components are thus connected to one another via the serpentine belt 614 and motion of the serpentine belt 614 may be translated into rotational movement of the accessory components at points of the accessory components in direct contact with the serpentine belt 614. Furthermore a set of clutches 616 may be positioned on either side of the AC compressor to engage or disengage the AC compressor from the serpentine belt 614.

Figure 2:
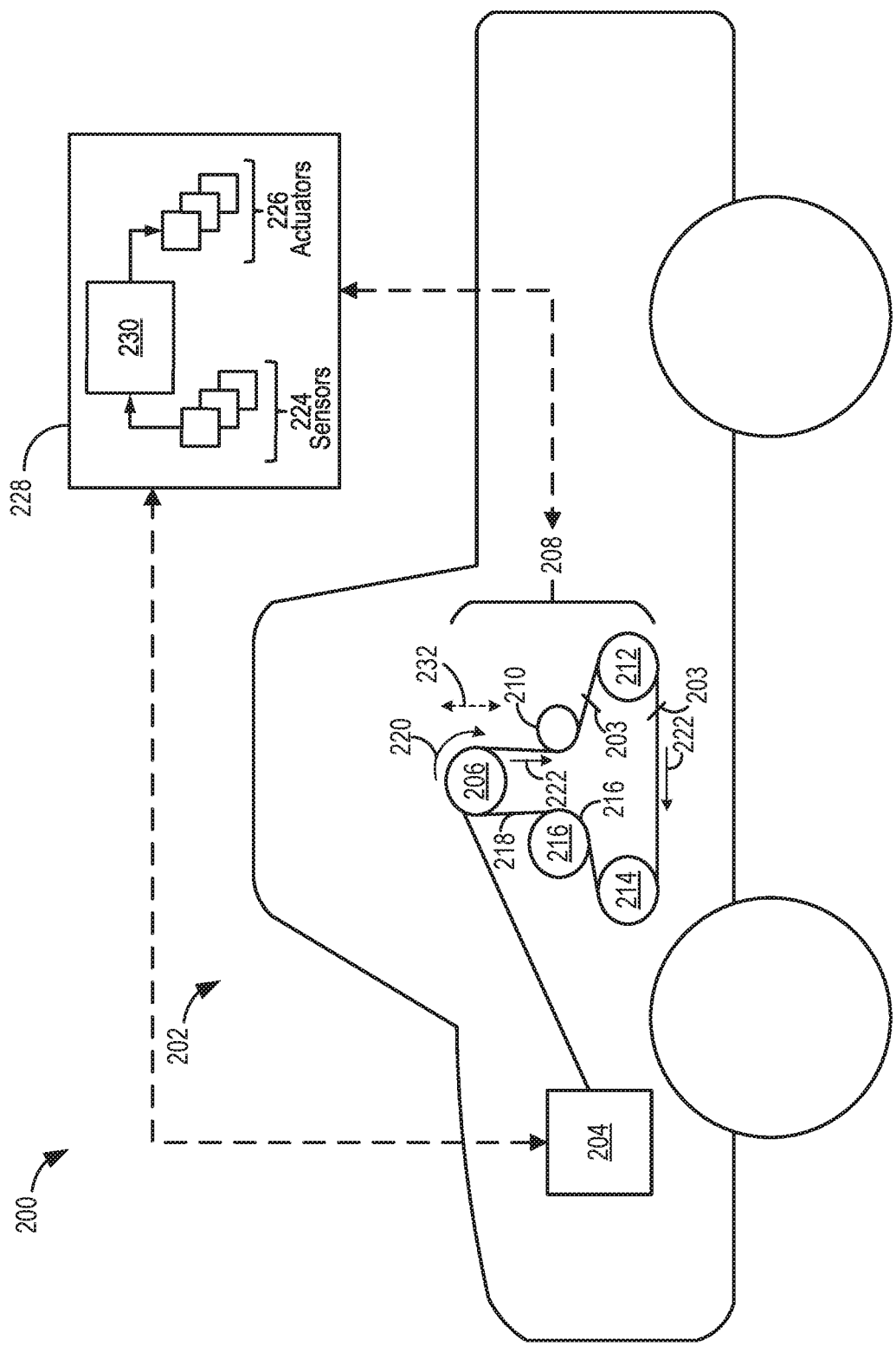
FIG. 2 shows a first schematic diagram of a first example of a vehicle from a production line of vehicles with an internal combustion engine operating an accessory train.

The line of vehicles 600 may be manufactured without a prime mover, e.g., an engine or electric motor, to allow an operator to choose whether to power a vehicle of the line of vehicles 600 by fuel combustion or by electric energy. A powertrain module of the line of vehicles 600 may be configured with instructions for either mode of operation. Examples of an adaptation of the first vehicle 602 to an internal combustion engine is shown in FIG. 2 and to an electric motor is shown in FIG. 3, both modes described further below. A second vehicle 650, shown in FIG. 6, includes the engine coupled to the system 604 via a front end of the crankshaft of the engine.

In a first schematic diagram 200, a first example of a vehicle 202 is shown in FIG. 2. The vehicle 202 may be manufactured with an IC engine installed or may be included in a line of vehicles configured to be operated by fuel combustion or by electric power. The IC engine 204 provides power to the first vehicle 202 by consuming a fuel, such as diesel, and includes a crankshaft. The crankshaft may translate reciprocating motion of engine pistons into rotational motion of the crankshaft as air and fuel are ignited in combustion chambers of the IC engine 204. The crankshaft may comprise a crankshaft pulley 206, fixedly coupled to the crankshaft and connected to an accessory train 208. The accessory train may include an idler pulley 210, an air conditioning (AC) compressor 212, a power steering pump 214, and a vacuum pump 216 providing low pressure to power brakes of the vehicle 202.

Components of the accessory train 208, as described above, may be connected via a continuous accessory train drive, or serpentine, belt 218. The serpentine belt 218 is in contact with each component of the accessory train 208, allowing motion of serpentine belt 218 to compel rotation of each component. For example, the crankshaft pulley 206, driven by the engine pistons, may rotate in a clockwise direction, indicated by arrow 220. Rotation of the crankshaft pulley 206 causes the serpentine belt 218 to rotate, also in the clockwise direction, as indicated by arrows 222. As the serpentine belt 218 rotates, friction between the serpentine belt 218 and each component of the accessory train 208 may transmit motion of the serpentine belt 218 to clockwise rotation of each component.

Rotation of the idler pulley 210 may assist in guiding the moving serpentine belt 218. In addition, tensioning of the serpentine belt 218 may be enabled by adjusting the idler pulley 210. The serpentine belt 218 may be directly coupled to an AC pulley of the AC compressor. Rotation of the AC pulley of the AC compressor 212, compelled by movement of the serpentine belt 218, powers operation of the AC compressor 212. As the AC pulley rotates, refrigerant is flowed through an AC loop, delivering the refrigerant to the AC compressor 212 to be compressed. The AC loop may provide cooling to a passenger cabin of the vehicle 202 by compressing the refrigerant and delivering the compressed fluid to other components of an AC system, e.g., a condenser.

The AC compressor 212 may be adapted with clutches 203 on either side of the AC compressor 212 along the serpentine belt 218 that engage the pulley of the AC compressor 212 with the serpentine belt 218 when clutched in or disengage the pulley from the serpentine belt 218 when de-clutched. The AC compressor pulley may be declutched as a nominal state when the serpentine belt 218 is rotating. The AC compressor may be clutched in upon a cabin cooling demand (e.g., in response to an operator request, indicated by an operator-activated switch or button). For example, when a request for cooling is detected, the AC compressor 212 is clutched in so that the clutches 203 engage the AC compressor 212 with the serpentine belt 218 and motion of the serpentine belt 218 is translated into rotation of the AC compressor 212. When the AC compressor is declutched however, the AC compressor 212 is disengaged from the serpentine belt 218 and motion of the serpentine belt 218 is no longer transmitted to the AC compressor 212.

In other examples, AC power/torque may also be modulated by varying a displacement of the AC compressor. However, since a change in displacement is known to be indirect, implementing clutches to engage and disengage the AC compressor may be desirable for fast unloading of AC compressor power or torque.

The serpentine belt 218 may be similarly coupled to a power steering pump pulley of the power steering pump 214. Rotation of the pulley of the power steering pump 214, compelled by movement of the serpentine belt 218, drives rotation of a rotor within the power steering pump 214 which pushes oil through chambers of the rotor, delivering high pressure fluid to a steering stack, e.g., a steering wheel, of a power steering system according to demand, where the power steering system includes the power steering pump 214, the steering stack, and fluid lines and reservoirs. Regulation of hydraulic pressure within the power steering system provided by the power steering pump 214 may be achieved by operation of a flow control valve in the power steering pump 214. The flow control valve adjusts a flow of fluid through the power steering pump 214 and thereby adjusts a hydraulic pressure of the power steering system. Adjustment of the hydraulic pressure enhances a force applied to the steering wheel when the steering wheel is turned by an operator. Adjustment of the fluid flow in the power steering pump 214 by the flow control valve may be actuated by steering wheel angle sensors that detect when the steering wheel is turned beyond a threshold angle.

The power steering pump 214 may be in constant operation while the serpentine belt 218 is in motion and driving rotation of the power steering pump pulley. Thus, the power steering pump 214 may exert a consistent base-level load on the serpentine belt 218 and crankshaft pulley. The load imposed by the power steering pump 214 may increase when the steering wheel is turned, indicating a higher demand for torque and diverting an increased portion of a total amount of torque provided by the serpentine belt 218.

In some examples, the power steering pump 214 may be coupled to an accumulator that is used as a pressure storage reservoir. The accumulator may allow a less powerful pump to provide torque to the power steering system and may store energy so that the power steering pump 214 may be activated even when the engine is turned off and the serpentine belt 218 is stationary. For example, a demand for power steering may be indicated by an operator prior to engine startup to initiate operation of the power steering pump 214. As a result, a delay in spinning up the power steering pump 214 is reduced during initial stages of engine operation subsequent to startup.

In addition, the vacuum pump 216 may be driven by the moving serpentine belt 218, the serpentine belt 218 rotating a rotor of the vacuum pump 216. When power braking is requested, valves in the vacuum pump 216 may be opened to allow the vacuum pump 216 to generate vacuum in a reservoir coupled to a brake booster to provide braking assistance. A drop in vacuum in the reservoir may occur upon providing braking assistance which may be replenished by operation of the vacuum pump 216.

In another example of the vehicle 202, the IC engine 204 may be configured to combust gasoline rather than diesel. As such, the vacuum pump 216 may not be included in the accessory train 208 due to inherent generation of low pressure in an intake manifold of the engine. The intake manifold may be directly coupled to the power braking system of the vehicle 202 as a vacuum source for power braking. As another alternative, regardless of type of fuel consumed by the IC engine 204, the power braking system may rely on hydraulic pressure rather than vacuum to supplement a braking force. The vacuum pump 216 may also be excluded from the accessory train 208 and the powering steering pump 214 may be directly coupled to the power braking system.

The vehicle 202 may have a plurality of sensors 224 and a plurality of actuators 226 included in a control system 228 of the vehicle 202. In some examples, the control system 228 may be the control system 190 of FIG. 1. A controller 230 may be configured as a microcomputer and may communicate with the plurality of sensors 224 and plurality of actuators 226, receiving information from the plurality of sensors 224 and, in response to the information, send instructions to the plurality of actuators 226. The plurality of sensors 224 may include a pedal position sensor at a brake pedal, steering wheel angle sensors, a manifold absolute pressure (MAP) sensor if the IC engine 204 burns gasoline, an engine position sensor, and a crankshaft position sensor.

Upon receiving data from the plurality of sensors, the controller 230 may send commands to the plurality of actuators 226. The plurality of actuators 226 may include a throttle arranged in the intake manifold of the IC engine 204, the clutches 203 configured to engage/disengage the AC compressor 212 with the serpentine belt 218, and other throttles and valves coupled to various locations in the vehicle 202. The controller 230 may receive input data from the various sensors, process the input data, and trigger the actuators in response to the processed input data based on instruction or code programmed therein corresponding to one or more routines.

As an example, the controller's response to a demand for power steering to assist turning of the vehicle or a request for cooling of the passenger cabin may be determined based on a first set of instructions stored in a memory of the controller 230. The first set of instructions may instruct actuators installed in the IC engine 204 and accessory train 208 to be operated based on information relayed to the controller 230 regarding current operating statuses of the IC engine 204 and components of the accessory train 208. The controller 230 may specifically refer to the first set of instructions or the first set of instructions may take precedence over other sets of instructions when the accessory train 208 is determined to be actuated by the IC engine 204. The other sets of instructions that are not the first set of instructions may be dormant in the memory of the controller 230 during active reference to the dominant first set of instructions. However, when an absence of the IC engine 204 is detected, a different set of codes may take priority.

A second example of a vehicle 302 is shown in a second schematic diagram 300 in FIG. 3. The vehicle 302 may be similar to the vehicle 202 of FIG. 2 but with the IC engine replaced by an electrically powered propulsion system. Alternatively, the vehicle 302 may also be included in the line of vehicles configured to be operated either by fuel combustion or by electric power. Unlike the vehicle 202 of FIG. 2, however, the vehicle 302 in FIG. 3 does not include an IC engine. The IC engine, as well as a transmission, may not be included in vehicle 302. An accessory train 304 may be similarly configured with a serpentine belt 318 in contact with components of the accessory train 304. The accessory train 304 includes an idler pulley 310, an AC compressor 312 adapted with clutches 303, a power steering pump 314, and a vacuum pump 316. In some examples, the power steering pump 314 may be coupled to an accumulator, as described above for the power steering pump 214 of FIG. 2. The accessory train 304 may be similar to the accessory train 208 of FIG. 2 and components of the accessory train 304 will not be re-introduced in the following description. As described above, in some examples, the vacuum pump 316 may not be included when the power braking system is coupled to the power steering pump 314.

When the IC engine, e.g., the IC engine 204 of FIG. 2, is not present, a crankshaft pulley such as the crankshaft pulley 206 of FIG. 2 is no longer available to drive the rotation of the serpentine belt 318 to actuate the accessory train 304. The serpentine belt 318 may instead be coupled to an electric motor 306, separate from a traction motor such as the motor 120 of FIG. 1. Whereas the traction motor propels a drive wheel of the vehicle 302, the electric motor 306 drives movement of the serpentine belt 318. In one example, the electric motor 306 may be a belt integrated starter generator (BiSG). The BiSG may replace both a starter and generator in a vehicle driven conventionally by the IC engine. Rotation of the electric motor 306 may be powered by a vehicle battery 308.

The electric motor 306 may have a diameter 332 that is smaller than a diameter 232 of the crankshaft pulley 206 (as shown in FIG. 2). A speed of rotation of the serpentine belt 318 may be constant whether implemented in the vehicle 202 of FIG. 2 or the vehicle 302 of FIG. 3. As a result, the electric motor 306' may be a compact, high-speed actuator, adapted to spin at faster speeds than the IC engine 204 of FIG. 2. By utilizing a high-speed electric motor 306, a size, weight, and/or cost of the electric motor may be reduced relative to an electric motor configured with a similar diameter as the crankshaft pulley 206 of the IC engine 204. However, the use of a smaller high-speed motor may result in the motor having a smaller torque output than demanded to operate all the accessory train components simultaneously.

The small size of the electric motor 306 may correspond to a lower power rating of the electric motor 306. As such, the electric motor 306 may be adapted to concurrently actuate a portion of the components of the accessory rather than all the components. For example, the electric motor 306 may be configured to operate the AC compressor 312 or the power steering pump 314, but not both simultaneously. When a power steering system of the vehicle 302 is activated by rotation of a steering wheel, increasing torque supply to the power steering pump may be prioritized and if the AC compressor 312 is already clutched in due to operator demand, the AC compressor 312 may be declutched to disengage the AC compressor 312 from the serpentine belt 318 even if cooling is requested. A load on the serpentine belt 318 is reduced to operation of the power steering pump 314, and the vacuum pump 316 when the vacuum pump 316 is present, but not the AC compressor 312.

When active power steering is not demanded, e.g., the steering wheel is maintained in a neutral position and the torque demand is reduced, and cooling via the AC compressor 312 is requested, the flow control valve of the power steering system is deactivated, e.g., does not actively adjust fluid flow. The AC compressor 312 is re-engaged with the serpentine belt 318 by the clutches 303. The hydraulic pressure in the power steering system is held constant while the AC compressor 312 actively compresses refrigerant as requested by an operator via an interfacing device such as a switch, button, or dial on an operator-controlled console of the vehicle 302 and/or based on a controller feedback loop. For example, the controller feedback loop may compare a sensed cabin temperature to a commanded cabin temperature and adjust activity of the AC compressor 312 in response to a difference between the sensed and commanded temperatures. If active cooling from the AC compressor 312 is not requested while active power steering is not demanded, the AC compressor 312 may remain declutched.

The accessory train 304 may be communicatively coupled to a controller 330 of a control system 328, which may be similar to controller 230 and control system 228 of FIG. 2, respectively. The controller 330 may receive information from a plurality of sensors 324 and send instructions to a plurality of actuators 326, as described above for vehicle 202 in FIG. 2. The actuators 326 of vehicle 302 may additionally include the electric motor 306 driving rotation of the serpentine belt 318. Without an IC engine installed in the vehicle 302 of FIG. 3, operation of the components of the accessory train 304 may be staggered to reduce an electric load on the electric motor 306. The controller 330 may refer to a second set of instructions and the first set of instructions, configured to provide commands when the IC engine is present, may be dormant in the controller's memory. Alternatively, when the IC engine is included, the second set of instructions may be dormant. The second set of instructions may instruct electric motor 306 to begin spinning when the vehicle 302 is turned on or activation of the electric motor 306 may be delayed until a power steering pump demand or AC compressor demand is detected.

The second set of instructions may instruct the controller 330 to provide torque to the components of the accessory train 304 in a non-overlapping (e.g., staggered) manner. For example, the controller 330 may coordinate operation of the AC compressor 312 and the power steering pump 314 by referring to the second set of instructions. Engagement and disengagement of the AC compressor 312 may be commanded by the controller 330 based on the second set of instructions in response to information received by the plurality of sensors 324. The controller 330 may rely on a third set of instructions to determine whether to refer to the first or second sets of instructions to operate the accessory train based on a configuration of the vehicle, e.g., whether the vehicle is vehicle 202 of FIG. 2, vehicle 302 of FIG. 3, and/or whether vehicle 202 has been converted to electric operation.

As described above, vehicle 202 of FIG. 2 and 302 of FIG. 3 may be similarly configured except for a method in which an accessory train of each vehicle is actuated. For example, a first vehicle adapted to be operated by an IC engine, e.g., vehicle 202 of FIG. 2, may have a power steering pump and AC compressor with dimensions and geometries equal to a power steering pump and AC compressor of a second vehicle adapted to be operated by an electric motor, e.g., vehicle 302 of FIG. 3. The power steering pump of the first vehicle may be configured provide an amount of steering assistance to the first vehicle that is equivalent to an amount of steering assistance provided by the power steering pump of the second vehicle. The power steering pump of the first vehicle may be coupled to equivalent components at equivalent locations as the power steering pump of the second vehicle, such as each power steering pump being in equivalent locations in the respective vehicles and each power steering pump being coupled to respective and equivalent steering stacks, fluid lines, and reservoirs. Similarly, the AC compressor of the first vehicle may be coupled to a passenger cabin to provide an amount of cooling equivalent to an amount of cooling provided by the AC compressor of the second vehicle to a passenger vehicle of the second vehicle. The AC compressor of the first vehicle may be coupled to equivalent components at equivalent locations as the AC compressor of the second vehicle, such as each AC compressor being in equivalent locations in the respective vehicles and each AC compressor being coupled to respective and equivalent AC condensers, fluid lines, etc. Furthermore, a frame of the first vehicle, including side panels, wheel axles, a roof, a bed, etc., may be similar in geometry, dimensions, and materials as a frame of the second vehicle. A compartment of the first vehicle in which the accessory train is located may be equal in volume and shape as a compartment in the second vehicle adapted to house the accessory train. Thus the first vehicle and the second vehicle may be used interchangeably with either the IC engine or the electric motor.

An example of a method 400 for operating an accessory train, such as the accessory trains 208 and 304 of FIGS. 2 and 3, of a vehicle configured to be operated by an IC engine or by electrical power is shown in FIG. 4. The vehicle may be manufactured with a conventional IC engine and, in some examples, the engine may be replaced by an electrically powered propulsion system or retrofitted with an electric motor to drive the accessory train. In other examples, the vehicle may be manufactured with an electrically powered propulsion system. The accessory train may include a serpentine belt that is in contact with accessory train components such as a power steering pump and an AC compressor. In some examples (not included in method 400), the accessory train may also include a vacuum pump of a power braking system. Movement of the serpentine belt compels rotation of the accessory train components, thereby powering the components. Adjustments for operation of the accessory train components may be commanded by a controller, such as the controller 230 of FIG. 2 and/or controller 330 of FIG. 3. For example, instructions to activate a flow control valve in the power steering pump to regulate hydraulic pressure in the power steering pump may be relayed from the controller, allowing the power steering pump to provide an assisting force when turning of a steering wheel is desired. Instructions for carrying out method 400 and the rest of the methods included herein may be executed by the controller based on instructions stored on the memory of the controller and in conjunction with signals received from sensors of the engine system, such as the sensors described above with reference to FIGS. 2 and 3. The controller may employ actuators of the accessory train to adjust accessory components operation, according to the methods described below.

At 402, the method includes driving the serpentine belt. The serpentine belt may be driven by an internal combustion (IC) engine at 404 where the serpentine belt is coupled to a crankshaft pulley of an engine crankshaft. When the engine is operated, the crankshaft and crankshaft pulley rotates, compelling movement of the serpentine belt. Alternatively, the serpentine belt may be driven by an electric motor at 406, the electric motor powered by an electrical energy source such as a battery. The electric motor may be directly coupled to the serpentine belt, thereby rotating the serpentine belt when the electric motor is activated.

When the belt is driven by an IC engine, the belt is driven any time the engine is on. However, when the belt is driven by an electric motor, the electric motor needs to be activated (e.g., turned on, commanded to operate) in order to drive the belt. Thus, in order to accommodate a vehicle where an IC engine is removed and the vehicle is retrofitted with an electric propulsion system, the controller may include instructions to detect whether the vehicle includes an IC engine or an electrically-driven propulsion system. For example, the controller may be coupled to multiple engine sensors and/or actuators (such as air flow sensors, exhaust gas sensors, an intake throttle, fuel injectors, and so forth) when the IC engine is installed. The controller may include instructions to detect if the engine is installed based on receiving output from the sensors, receiving feedback/position control output from the actuators, or other mechanisms. The controller may also include instructions to detect if the engine has been replaced by the electrical propulsion system based on receiving the above feedback and/or based on receiving feedback from a sensor or other output associated with the electric propulsion, such as a signal that the vehicle has been started (e.g., as sent by a vehicle start button). When the controller detects that the vehicle includes an electric propulsion system, the controller may activate otherwise dormant instructions to turn on the electric motor upon vehicle start-up and/or upon a power steering or AC compressor demand.

The method determines, at 408, if AC is requested by an operator. Cooling of a passenger cabin may be indicated by an operator-controlled switch or button and/or based on a cabin temperature control loop. If no request for AC is detected, the method continues to 410 to operate the accessory train with the AC compressor declutched. Operating the accessory train with the AC compressor declutched may include operating the accessory train to drive the power steering pump with at least a base-line amount of torque. In this way, the power steering pump may be operated independent of AC compressor status and may be operated any time the belt is driven. The method then returns to the start.

At 408, if a request for AC is detected by the controller, the method proceeds to 412 to determine if operation of the power steering (PS) pump is demanded below a threshold level. A demand for power steering may be indicated by detection of the steering wheel being rotated by at least a threshold angle, the rotation of the steering wheel corresponding to an increase in demand for torque supplied by the serpentine belt to the power steering pump pulley. If the steering wheel is not rotated to or beyond the threshold angle, the torque demand for the power steering pump is below the threshold level. However, if the steering wheel is turned to or greater than the threshold angle, the demand meets or surpasses the threshold level. As an example, steering wheel angle sensors positioned in a base of the steering wheel may be adapted to relay signals to the controller when the steering wheel is turned at least 10 degrees. Upon receiving the information from the steering wheel angle sensors that the steering wheel is rotated by at least the threshold angle, the controller may command activation of the flow control valve of the power steering pump to adjust the hydraulic pressure of the power steering pump.

If the power steering pump demand is not below the threshold, e.g., the demand is at or above the threshold, the method continues to 414 to operate the accessory train with the AC compressor disengaged from the serpentine belt so that a greater portion of the torque supplied by the serpentine belt is diverted to the power steering pump. The method then returns to 412 to continue assessing if the power steering demand is below the threshold. If the demand is below the threshold, the method continues to 416 to clutch in the AC compressor so that the AC compressor is engaged with the serpentine belt. Cooling to the passenger cabin is provided according to demand.

At 418, the method includes determining if the power steering pump torque demand reaches the threshold, as described above for 412. The torque demand for power steering may be indicated by detection of the steering wheel being rotated by at least a threshold angle when, for example, the operator is navigating the vehicle through a turn. If the steering wheel is not rotated to or beyond the threshold angle, as determined by steering wheel angle sensors, the torque demand for the power steering pump is below the threshold level. However, if the steering wheel is turned to or greater than the threshold angle, the demand meets or surpasses the threshold level. If the power steering pump torque demand does not reach the threshold, e.g., the steering wheel angle sensors do not detect rotation of the steering wheel to or beyond the threshold angle, the method returns to 416 to continue operation of the accessory train with the AC compressor engaged with the serpentine belt and a base-line amount of torque provided to the power steering pump. If the power steering pump demand reaches the threshold, the method continues to 420 to declutch the AC compressor from the serpentine belt. Increased torque is supplied to the power steering pump and the flow control valve of the power steering pump is actuated to adjust hydraulic pressure in the power steering pump. The method then returns to the start.

A method 500 is shown in FIG. 5 for operating an accessory train of a line of vehicles. The line of vehicles may be manufactured without a prime mover, e.g., prime mover 110 of FIG. 1, but with an AC compressor and a power steering pump included in the accessory train. Alternatively, the vehicle may be manufactured with a conventional IC engine and, in some examples, the engine may be replaced by an electrically powered propulsion system or retrofitted with an electric motor to drive the accessory train. In other examples, the vehicle may be manufactured with an electrically powered propulsion system. A serpentine belt of the accessory train is coupled to both the AC compressor and the power steering pump and movement of the serpentine belt compels rotation of an AC compressor pulley and a power steering pump pulley, thereby driving operation of the accessory train components. The serpentine belt may be driven by either an IC engine or by an electric motor. Adjustments for operation of the accessory train components may be commanded by a controller, such as the controller 230 of FIG. 2 and/or controller 330 of FIG. 3. The controller may refer to a first set of instructions based on a presence of the electric motor or a second set of instructions based on a presence of the IC engine. Instructions for carrying out method 500 and the rest of the methods included herein may be executed by the controller based on instructions stored on the memory of the controller and in conjunction with signals received from sensors of the engine system, such as the sensors described above with reference to FIGS. 2 and 3. The controller may employ actuators of the accessory train to adjust accessory components operation, according to the methods described below.

At 502, the method includes determining whether the IC engine is present in a vehicle of the line of vehicles. Detecting the presence of the IC engine may, as an example, occur by searching for signals from sensors located in the IC engine. The search may be activated by an event such as a key-on event, indicating that operation of the vehicle is desired. For example, upon detection of a key-on event, the controller may attempt to communicate with a plurality of engine sensors, such as a mass air flow sensor, an engine coolant temperature sensor, a manifold absolute pressure sensor, and a sensor adapted to measure a crankshaft position. If the controller is unable to communicate with the engine sensors, the engine may be determined to be absent. In other examples, a digital image of engine microcontrollers may be altered via calibration, flash, over-the-air reprogramming, etc., so that a powertrain control module code of the controller is adapted to a vehicle without an IC engine.

If the IC engine is determined to be absent based on lack of communication with the sensors as described above, the method continues to 504 to drive the serpentine belt by activating the electric motor. The power steering pump is operated as the serpentine belt rotates the power steering pump pulley, providing at least a base-line level of torque to the power steering pump, and the flow control valve of the power steering pump is actuated to regulate hydraulic pressure in the power steering pump based on demand. A torque demand from the serpentine belt for power steering may be detected by steering wheel angle sensors that relay information to the controller when a steering wheel is rotated beyond a threshold angle, as described above with respect to FIG. 4. The controller instructs the flow control valve to adjust fluid flow in the power steering pump to provide an assisting force during turning of the vehicle wheels.

The AC compressor is operated based on demand at 508. The demand on the AC compressor includes clutching in the AC compressor to engage the AC compressor pulley with the serpentine belt when a request for cooling is indicated by an operator-controlled switch or button. Furthermore, the demand on the AC compressor also includes adjusting operation of the AC compressor based on the demand for power steering. Due to a small size of the electric motor driving the serpentine belt, the electric motor may be configured to provide sufficient power to allow operation of either the power steering pump at increased torque demand or the AC compressor, but not both simultaneously. In some examples, a load imposed on the electric motor by the AC compressor may be controlled by a combination of clutching/declutching the AC compressor and adjusting a variable displacement of the AC compressor.

Thus, at 510, the AC compressor is declutched from the serpentine belt when a request for assistance for turning the vehicle wheels at or above the threshold angle is detected by steering wheel angle sensors. The AC compressor is disengaged regardless of a request for cabin cooling, allowing operation of the power steering pump to be prioritized. The method then returns to the start.

Returning to 502, if the IC engine is determined to be present, the method continues to 512. When the IC engine is present, the accessory train is coupled to the crankshaft by the crankshaft pulley. Rotation of the crankshaft, induced by engine operation, drives movement of the serpentine belt and rotation of the accessory train components. The power steering pump and AC compressor are operated according to demand, both simultaneously and independently at 514. The method then returns to the start.

In this way, a vehicle may be readily convertible between operation by fuel combustion or by an electrical energy source. The vehicle may have an accessory train including components such as an AC compressor, a power steering pump, and a power braking vacuum pump. The accessory train components may be connected by a continuous serpentine belt that compels rotation of the accessory train components, thereby mechanically powering the components as the serpentine belt itself is rotated. Movement of the serpentine belt may be actuated by an IC engine, when present, by coupling the serpentine belt to a crankshaft of the IC engine. When the vehicle is in operation, the serpentine belt is rotated continuously by the crankshaft and the accessory train components are operated as demanded, concurrently or independently. In contrast, when the vehicle is powered by electrical energy and the IC engine is not present, the serpentine belt may be rotated by an electric motor. The electric motor may be configured to be small in size, operating at a high speed to maintain serpentine belt movement at least equal to that provided by the crankshaft. The size of the electric motor may assist in maintaining a low cost of a conversion of the vehicle to electric power as well as a low weight and minimal amount of space occupied by the electric motor. However, the small size of the electric motor may reduce a power capacity of the electric motor so that the electric motor may not be able to operate all the accessory train components simultaneously. Thus, the AC compressor may be adapted with clutches that engage the AC compressor with the serpentine belt when enhanced torque supply for power steering is not demanded. When higher torque for power steering is requested, the AC compressor is declutched from the serpentine belt. Power steering is thereby prioritized over cooling of a passenger cabin even when cooling is requested and operation of the power steering pump and AC compressor is coordinated. A controller for the line of vehicles may be configured with a first set of instructions specific to operation of the accessory train components when the IC engine is present and a second set of instructions specific to operation of the accessory train components when IC engine is not included. The controller may refer to one set of instructions depending on whether the IC engine is present of not, rendering the other set of instructions dormant in a memory of the controller. As a result, the vehicle may be readily convertible between deriving power via fuel combustion or via an electric source without replacement or reconfiguration of the accessory train components.

The technical effect of configuring a vehicle to be convertible between drawing power from an IC engine and an electric device is that operation of accessory train components of the line of vehicles is maintained.

In one example, the approaches herein enable a manufacturer to sell a vehicle line where the same vehicle body, HVAC, power steering system, etc., can be used with an OEM engine configuration powering the powertrain to drive wheels of the vehicle as if the vehicle is sold without an engine and configured to receive an electric motor to drive the drivetrain and wheels. However, because the AC compressor and power steering pump are configured as described, the electric motor driven vehicle can further have another electric motor added to drive these accessories and utilize OEM components of the HVAC and power steering so as to simplify, greatly, conversion to an electric vehicle without an internal combustion engine. The positioning and coupling of the HVAC and/or power steering system components is identical between the two vehicles in the vehicle line sold by the OEM, and may be made on the same assembly line. For example, the same sized and positioned power steering pump is used in both vehicles, coupled to the same hydraulic system, and steering components of the suspension and wheels, positioned in the same position in both vehicles. The same HVAC controls used by the drive/passenger can also be carried through whether the vehicle is engine driven or converted to motor driven operation.

In one example, a vehicle includes a frame, an accessory train installed within the frame, the accessory train including a belt driving a power steering pump and an air conditioning (AC) compressor, and a controller storing a first set of instructions and a second set of instructions in a memory of the controller, the first set of instructions executable to operate the accessory train when the controller detects an engine is installed in the frame, the second set of instructions executable to operate the accessory train when the controller detects a traction motor and not an engine is installed in the frame. In a first example of the vehicle, the first set of instructions is executable to operate the AC compressor independent of a power steering demand, and wherein the second set of instructions is executable to operate the AC compressor based on the power steering demand. A second example of the vehicle optionally includes the first example and further includes, wherein the second set of instructions is executable to operate the accessory train by activating an electric motor coupled to the belt. A third example of the vehicle optionally includes one or more of the first and second examples, and further includes, wherein the second set of instructions is executable to determine the power steering demand, and responsive to a request to activate the AC compressor, engage the AC compressor to the belt only if the power steering demand is below a threshold, wherein the accessory train includes one or more clutches to engage and disengage the AC compressor from the belt. A fourth example of the vehicle optionally includes one or more of the first through third examples, and further includes, wherein the vehicle includes the engine installed in the frame and a crankshaft of the engine is coupled to and configured to drive the belt. A fifth example of the vehicle optionally includes one or more of the first through fourth examples, and further includes, wherein the vehicle includes the traction motor installed in the frame and an electric motor is coupled to and configured to drive the belt.

In another example, a line of vehicle includes a first vehicle including an internal combustion engine, a first accessory train driven by the internal combustion engine, the first accessory train including a first belt driving a first power steering pump and a first AC compressor; and a first controller adapted to refer to a first set of instructions, the first set of instructions providing instructions for the first vehicle, and a second vehicle including, a traction motor, a second accessory train, the second accessory train driven by an electric motor and including a second belt driving a second power steering pump and a second AC compressor, and a second controller adapted to refer to a second set of instructions, the second set of instructions providing instructions for the second vehicle. In a first example of the line of vehicles, a location of the first accessory train in the first vehicle is relative to a geometry of the first vehicle is the same as a location of the second accessory train in the second vehicle relative to a geometry of the second vehicle. A second example of the line of vehicles optionally includes the first example, and further includes, wherein the first power steering pump and the first AC compressor are of equal dimensions and geometry as the second power steering pump and the second AC compressor. A third example of the line of vehicles optionally includes one or more of the first and second examples, and further includes wherein the first power steering pump provides an amount of steering assistance to the first vehicle that is equivalent to an amount of steering assistance provided to the second vehicle by the second steering pump. A fourth example of the line of vehicles optionally includes one or more of the first through third examples, and further includes, wherein a coupling of the first AC compressor to a cabin of the first vehicle to provide cooling is equivalent to a coupling of the second AC compressor to a cabin of the second vehicle to provide cooling. A fifth example of the line of vehicles optionally includes one or more of the first through fourth examples, and further includes, wherein a frame of the first vehicle housing the first accessory train has a same positional configuration as a frame of the second vehicle housing the second accessory train. A sixth example of the line of vehicles optionally includes one or more of the first through fifth examples, and further includes, wherein a compartment in the first vehicle housing the first accessory train is equal in volume and position to a compartment in the second vehicle housing the second accessory train. A seventh example of the line of vehicles optionally includes the first through sixth examples, and further includes, wherein the power steering pump and AC compressor are operated simultaneously in the first vehicle and operated in a coordinated manner in the second vehicle.

In another example, a system includes a controller including memory with instructions stored therein executable to in a first mode, in response to detection of a presence of an internal combustion engine, operate components of the accessory train as demanded by an operator, including operating the AC compressor independently of the power steering pump, and in a second mode, in response to detection of an absence of the internal combustion engine, operate the AC compressor in coordination with the power steering pump. In a first example of the system the controller commands operation of the AC compressor based on receiving a request for cabin cooling from an operator and commands increasing a torque supply to the power steering pump when increased torque demand is indicated based on rotation of a steering wheel by an operator. A second example of the system optionally includes the first examples, and further includes, wherein in the first mode, the components of the accessory train are operated simultaneously when commanded by the controller upon receiving requests for increased torque for both power steering and cooling. A third example of the system optionally includes one or more of the first and second examples, and further includes, wherein the AC compressor is adapted with clutches to engage the AC compressor with the belt to operate the AC compressor and to disengage the AC compressor from the belt to deactivate the AC compressor. A fourth example of the system optionally includes one or more of the first through third examples, and further includes, wherein the instructions are executable to, in the second mode, activate an electric motor coupled to the belt to drive the accessory train and disengage the AC compressor from the belt when an increased torque demand for power steering is indicated. A fifth example of the system optionally includes one or more of the first through fourth examples, and further includes, wherein the instructions are executable to, in the second mode, engage the AC compressor with the belt only when no increased torque demand for power steering is indicated and a request for cooling is detected.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle comprising:
   a frame;
   an accessory train installed within the frame, the accessory train including a belt driving a power steering pump and an air conditioning (AC) compressor; and
   a controller storing a first set of instructions and a second set of instructions in a memory of the controller, the first set of instructions executable to operate the accessory train when the controller detects an engine is installed in the frame, the second set of instructions executable to operate the accessory train when the controller detects a traction motor and not an engine is installed in the frame.

2. The vehicle of claim 1, wherein the first set of instructions is executable to operate the AC compressor independent of a power steering demand, and wherein the second set of instructions is executable to operate the AC compressor based on the power steering demand.

3. The vehicle of claim 2, wherein the second set of instructions is executable to operate the accessory train by activating an electric motor coupled to the belt.

4. The vehicle of claim 2, wherein the second set of instructions is executable to:
   determine the power steering demand; and
   responsive to a request to activate the AC compressor, engage the AC compressor to the belt only if the power steering demand is below a threshold, wherein
   the accessory train includes one or more clutches to engage and disengage the AC compressor from the belt.

5. The vehicle of claim 1, wherein the vehicle includes the engine installed in the frame and a crankshaft of the engine is coupled to and configured to drive the belt.

6. The vehicle of claim 1, wherein the vehicle includes the traction motor installed in the frame and an electric motor is coupled to and configured to drive the belt.

7. A line of vehicles comprising:
   a first vehicle including:
      an internal combustion engine;
      a first accessory train driven by the internal combustion engine, the first accessory train including a first belt driving a first power steering pump and a first AC compressor; and
      a first controller adapted to refer to a first set of instructions, the first set of instructions providing instructions for the first vehicle; and
   a second vehicle including:
      a traction motor;
      a second accessory train, the second accessory train driven by an electric motor and including a second belt driving a second power steering pump and a second AC compressor; and
      a second controller adapted to refer to a second set of instructions, the second set of instructions providing instructions for the second vehicle;
   wherein, in the first vehicle, the first power steering pump and the first AC compressor are operated simultaneously and, in the second vehicle, the second power steering pump and the second AC compressor are operated in a coordinated manner.

8. The line of vehicles of claim 7, wherein a location of the first accessory train in the first vehicle relative to a geometry of the first vehicle is the same as a location of the second accessory train in the second vehicle relative to a geometry of the second vehicle.

9. The line of vehicles of claim 8, wherein the first power steering pump and the first AC compressor are of equal dimensions and geometry as the second power steering pump and the second AC compressor.

10. The line of vehicles of claim 9, wherein the first power steering pump provides an amount of steering assistance to the first vehicle that is equivalent to an amount of steering assistance provided to the second vehicle by the second steering pump.

11. The line of vehicles of claim 10, wherein a coupling of the first AC compressor to a cabin of the first vehicle to provide cooling is equivalent to a coupling of the second AC compressor to a cabin of the second vehicle to provide cooling.

12. The line of vehicles of claim 7, wherein a frame of the first vehicle housing the first accessory train has a same positional configuration as a frame of the second vehicle housing the second accessory train.

13. The line of vehicles of claim 7, wherein a compartment in the first vehicle housing the first accessory train is equal in volume and position to a compartment in the second vehicle housing the second accessory train.

14. A system for operating components of an accessory train of a vehicle, the components including a belt, a belt-driven power steering pump, and a belt-driven air conditioning (AC) compressor, comprising:
   a controller including memory with instructions stored therein executable to:
      in a first mode, in response to detection of a presence of an internal combustion engine, operate components of the accessory train as demanded by an operator, including operating the AC compressor independently of the power steering pump; and
      in a second mode, in response to detection of an absence of the internal combustion engine, operate the AC compressor in coordination with the power steering pump.

15. The system of claim 14, wherein the controller commands operation of the AC compressor based on receiving a request for cabin cooling from an operator and commands increasing a torque supply to the power steering pump when increased torque demand is indicated based on rotation of a steering wheel by an operator.

16. The system of claim 14, wherein in the first mode, the components of the accessory train are operated simultaneously when commanded by the controller upon receiving requests for increased torque for both power steering and cooling.

17. The system of claim 14, wherein the AC compressor is adapted with clutches to engage the AC compressor with the belt to operate the AC compressor and to disengage the AC compressor from the belt to deactivate the AC compressor.

18. The system of claim 17, wherein the instructions are executable to, in the second mode, activate an electric motor coupled to the belt to drive the accessory train and disengage the AC compressor from the belt when an increased torque demand for power steering is indicated.

19. The system of claim 18, wherein the instructions are executable to, in the second mode, engage the AC compressor with the belt only when no increased torque demand for power steering is indicated and a request for cooling is detected.

* * * * *